(12) United States Patent
Hariharan et al.

(10) Patent No.: US 11,665,800 B2
(45) Date of Patent: May 30, 2023

(54) CONTROL CIRCUIT FOR IMPROVING INFRARED (IR) EMITTER STORAGE CAPACITOR UTILIZATION

(71) Applicant: Maxim Integrated Products, Inc., San Jose, CA (US)

(72) Inventors: Suresh Hariharan, Livermore, CA (US); Gregory Michael Fattig, Alamo, CA (US); Ramesh Selvaraj, San Jose, CA (US); Ron Vincent Ocampo, San Jose, CA (US)

(73) Assignee: Maxim Integrated Products Inc., San Jose, CA (US)

( * ) Notice: Subject to any disclaimer, the term of this patent is extended or adjusted under 35 U.S.C. 154(b) by 0 days.

(21) Appl. No.: 17/552,507

(22) Filed: Dec. 16, 2021

(65) Prior Publication Data

US 2022/0264721 A1    Aug. 18, 2022

Related U.S. Application Data

(60) Provisional application No. 63/150,427, filed on Feb. 17, 2021.

(51) Int. Cl.
*H05B 45/30* (2020.01)
*H05B 45/375* (2020.01)
*H05B 45/38* (2020.01)

(52) U.S. Cl.
CPC .......... *H05B 45/375* (2020.01); *H05B 45/38* (2020.01)

(58) Field of Classification Search
CPC ...... H05B 45/37; H05B 45/39; H05B 45/375; H05B 45/395; H05B 45/3725
See application file for complete search history.

(56) References Cited

U.S. PATENT DOCUMENTS

| | | | |
|---|---|---|---|
| 8,975,831 B1* | 3/2015 | Szolusha | H05B 45/3725 315/291 |
| 10,531,527 B1 | 1/2020 | Milanesi et al. | |
| 2006/0043911 A1* | 3/2006 | Shao | H05B 45/38 315/291 |
| 2014/0021879 A1* | 1/2014 | Yu | H05B 45/38 315/206 |
| 2014/0159611 A1* | 6/2014 | Elferich | H05B 45/10 315/294 |

(Continued)

FOREIGN PATENT DOCUMENTS

| | | |
|---|---|---|
| KR | 20170050014 A | 5/2017 |
| KR | 101987296 B1 | 2/2018 |
| WO | 2020082178 A1 | 4/2020 |

*Primary Examiner* — Tung X Le
(74) *Attorney, Agent, or Firm* — North Weber & Baugh LLP; Michael North (57) ABSTRACT

Described herein are systems and methods for operating DC-DC regulators such as LED drivers. Various embodiments herein allow a DC-DC regulator to switch between buck mode and buck-boost mode without suffering effects otherwise resulting from transient currents when switching between modes. In certain embodiments, this is accomplished by operating the DC-DC regulator in a buck-boost mode to charge a boost capacitor with a substantially constant inductor current. The inductor current is also used to control a set of switches to operate the DC-DC regulator in a buck mode to drive a load by using the capacitor as a power source.

20 Claims, 8 Drawing Sheets

(56) References Cited

U.S. PATENT DOCUMENTS

| | | | | |
|---|---|---|---|---|
| 2015/0289325 A1* | 10/2015 | Szolusha | ............... | H05B 45/38 |
| | | | | 315/201 |
| 2016/0066377 A1* | 3/2016 | Chen | ..................... | H05B 45/46 |
| | | | | 315/307 |
| 2017/0019965 A1* | 1/2017 | Takacs | ................. | H05B 45/375 |
| 2020/0366206 A1* | 11/2020 | Hariharan | ............. | H05B 45/38 |
| 2021/0125542 A1 | 4/2021 | Liu et al. | | |

* cited by examiner

CONTROL CIRCUIT FOR IMPROVING INFRARED (IR) EMITTER STORAGE CAPACITOR UTILIZATION

CROSS REFERENCE TO RELATED PATENT APPLICATIONS

The present application claims priority benefit, under 35 U.S.C. § 119(e), and commonly-assigned U.S. provisional patent application No. 63/150,427, filed on Feb. 17, 2021, entitled "Control Circuit for Improving Infrared (IR) Emitter Storage Capacitor Utilization," listing as inventors Suresh Hariharan, Gregory Michael Fattig, Ramesh Selvaraj, and Ron Vincent Ocampo, which application is herein incorporated by reference as to its entire content. Each reference mentioned in this patent document is incorporated by reference herein in its entirety.

BACKGROUND

A. Technical Field

The present disclosure relates generally to control systems. More particularly, the present disclosure relates to regulator systems and methods for applications such as LED drivers.

B. Background

Infrared emitter (IR) drivers for machine vision typically use a two-stage topology. A DC/DC boost converter charges a storage tank capacitor with a constant current. The tank capacitor, in a subsequent a buck mode, acts as a power source for a buck LED driver circuit that drives an IR emitter string to generate an illumination flash, for example, to flash a scene with IR light that a camera may use to capture an image for the machine vision application. The two modes of operation are switched by a logic control signal, typically called "strobe." A strobe high signal indicates that the LEDs should flash on, corresponding to an image sensor shutter opening. A strobe low signal indicates that the LEDs should be turned off, corresponding to the image sensor shutter being closed, e.g., in preparation of a data transfer. The advantage of such two-stage approaches is a flattened and low peak current may be drawn from the input supply while the LEDs are turned off and no power, other than quiescent current, is drawn from the input supply while the LEDs are turned on.

Figure 1A:
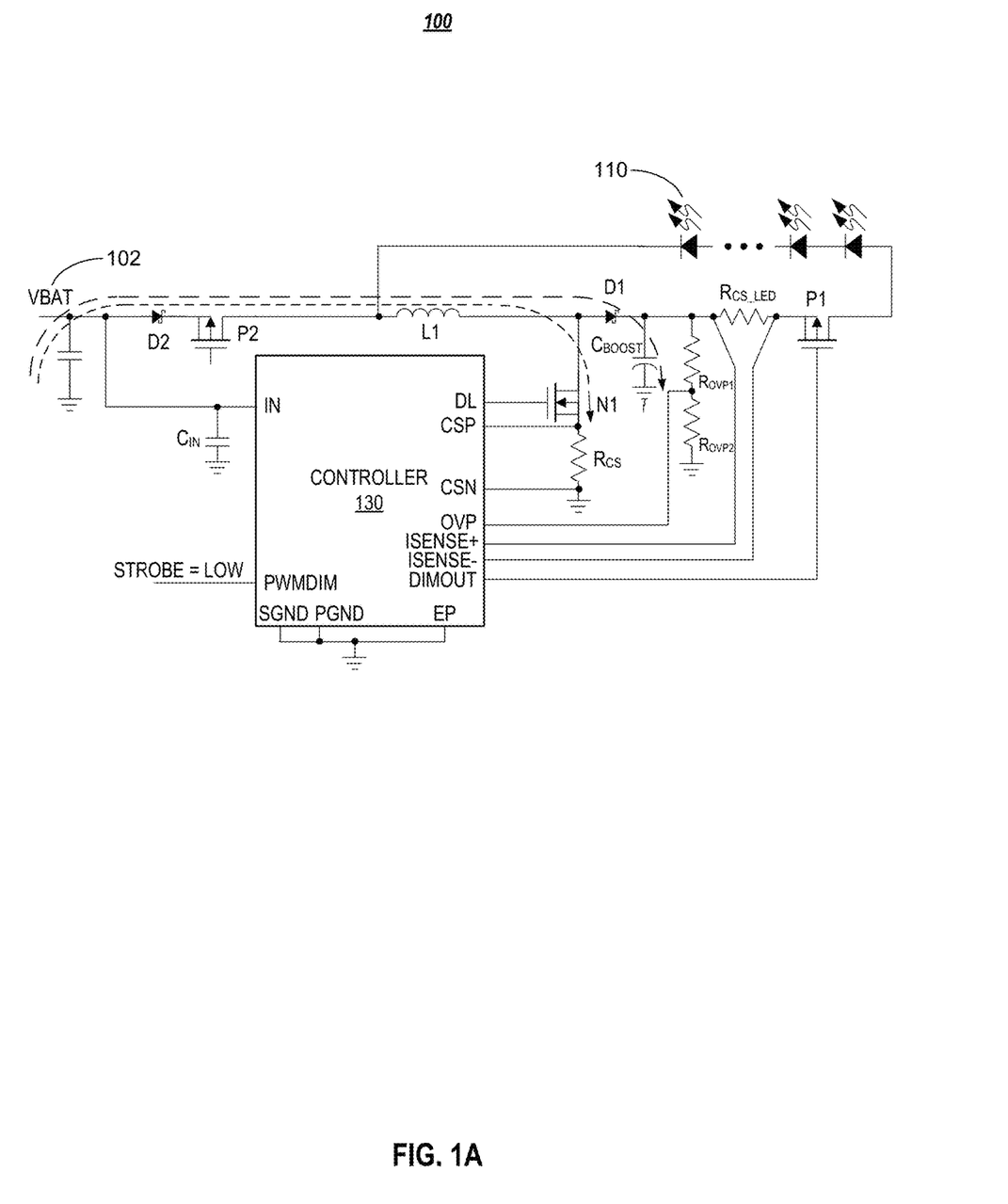
FIG. 1A depicts a single power stage operating in boost mode.
Figure 1B:
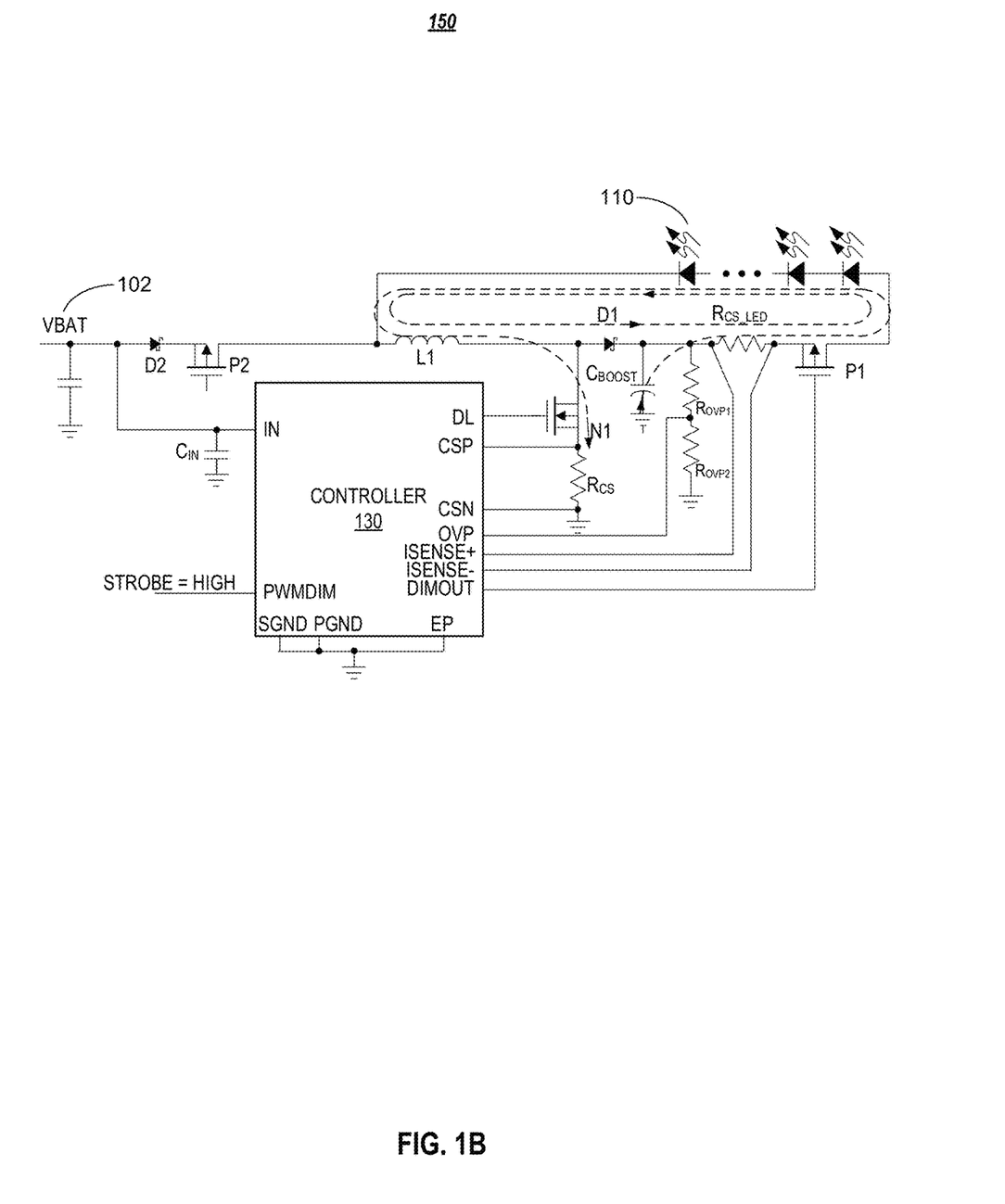
FIG. 1B depicts the single power stage of FIG. 1A operating in buck mode.

Some topologies achieve the same benefit by utilizing a single power stage. FIG. 1A and FIG. 1B show such a single power stage that, in FIG. 1A, operates in boost mode and in FIG. 1B operates in buck mode. In boost mode, single power stage 100 acts as a boost DC/DC converter to charge the boost capacitor $C_{BOOST}$, while switch P1 turns off the string of LEDs. As long as the boost voltage on capacitor $C_{BOOST}$ is greater than the input voltage, the boost converter 100 will regulate the current from the input to the output. The output voltage is sensed, and that signal is used to terminate the charging at a programmed boost voltage level based on the application's power requirements.

Then, in buck mode, once the strobe signal goes high, the switch P1 turns on, and switch P2 turns off to disconnect the battery voltage VBAT from power stage 150, the string of LEDs is energized by the boost capacitor $C_{BOOST}$ as shown in FIG. 1B. In other words, when the LEDs are turned on, the battery is disconnected, the tank capacitor becomes the power source, and the same power stage is reused as a buck LED driver.

Figure 2:
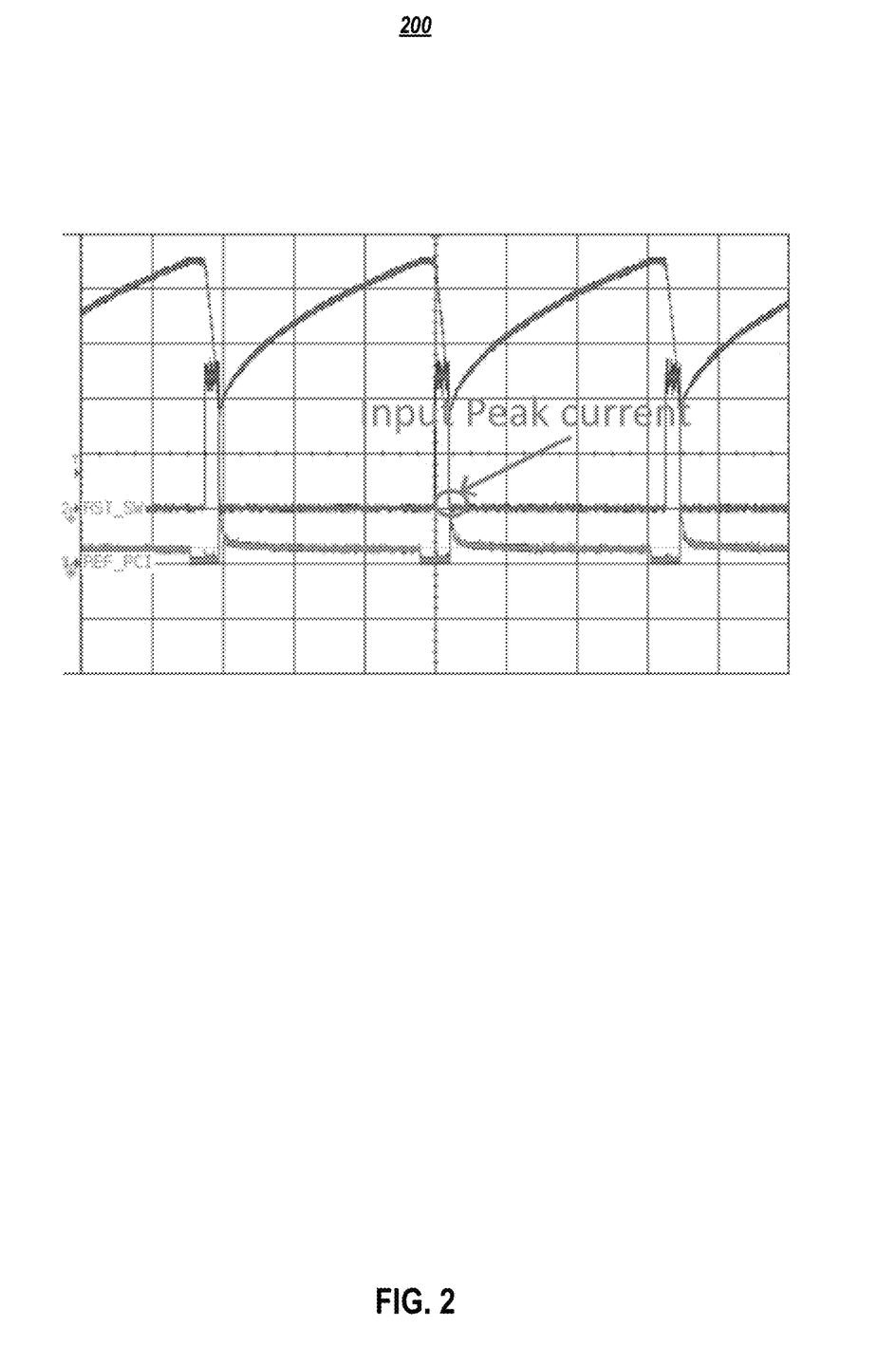
FIG. 2 depicts known input current spikes caused by a mode transition from buck mode to boost mode.

One main shortcoming of these approaches is that the boost capacitor $C_{BOOST}$ cannot be discharged below the battery voltage due to the risk of an inrush current that may occur in the boost converter if the output voltage becomes less than the input voltage. FIG. 2 depicts an input current spike that is caused as a result of a mode transition to boost mode from buck mode where the boost capacitor $C_{BOOST}$ that has been discharged below the battery voltage is rapidly charged by the battery in an uncontrolled manner. In certain applications, such input current spikes are unacceptable for a number of reasons, including unwanted electro-magnetic interference (EMI) effects.

Accordingly, it is highly desirable to overcome deficiencies of existing approaches.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms, and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits.

It is noted that embodiments herein are described in the context of LED drivers, yet, one skilled in the art will recognize that the teachings of the present disclosure are not limited to driver applications, such as light source drivers, solid-state (e.g., LEDs, Vertical-Cavity Surface-Emitting Lasers (VCSELs)) light source drivers, for example, and may equally be applied or adapted for use in other contexts involving buck and boost circuitry and loads other than light sources.

In this document, LEDs and LED array are used interchangeably. The terms buck, buck circuit, and buck converter, and buck converter sub-circuit are used interchangeably. Similarly, the terms boost, boost circuit, and boost converter sub-circuit are used interchangeably. "Sub-circuit" refers to a combination of circuit components in a circuit. The term "switch" refers to any type of switch known in the art, e.g., a MOSFET transistor.

Figure 3:
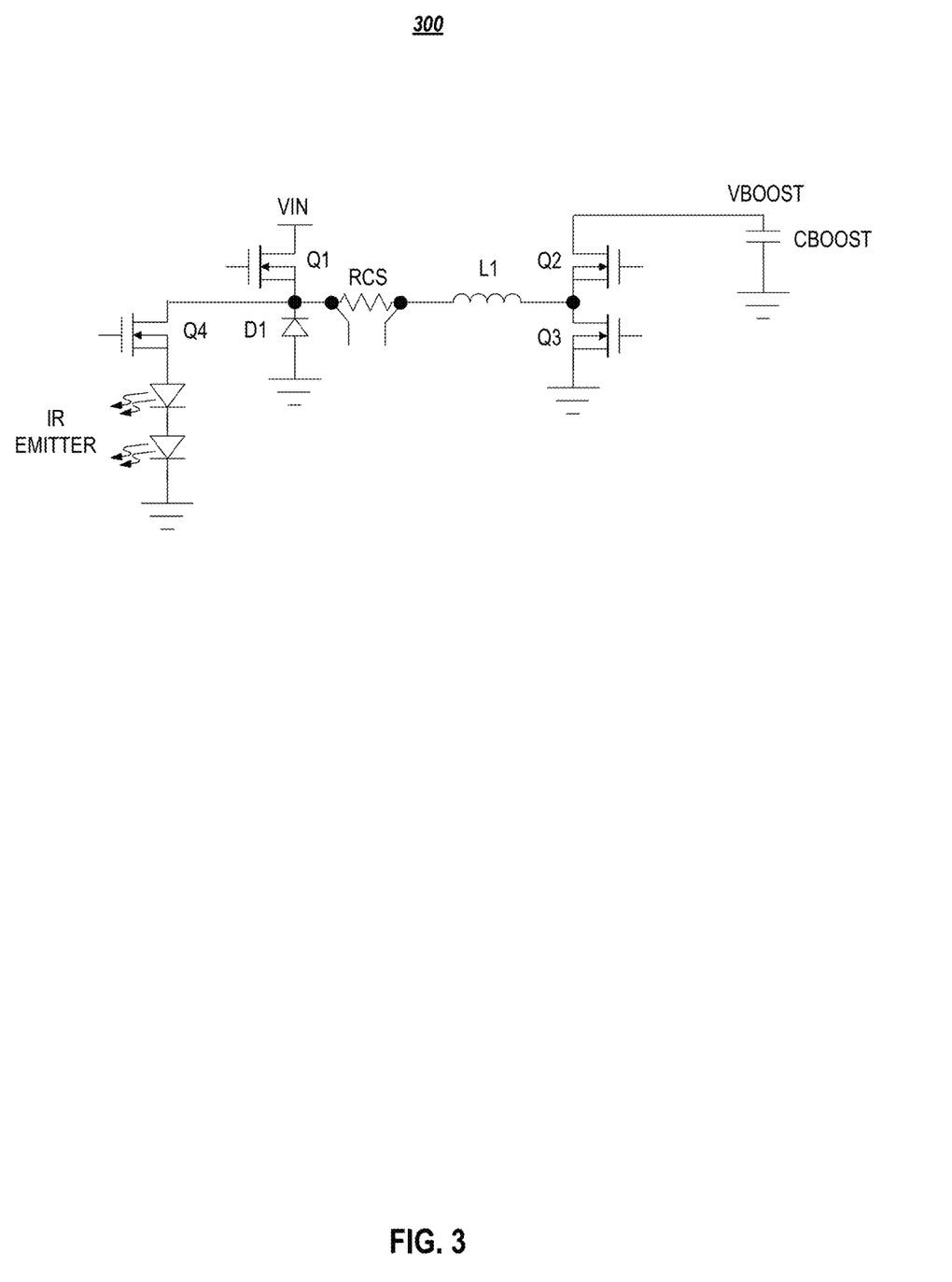
FIG. 3 illustrates an exemplary implementation of an LED driver circuit according to various embodiments of the present disclosure.

FIG. 3 illustrates an exemplary implementation of an LED driver circuit according to various embodiments of the present disclosure. In embodiments, LED driver circuit 300 may be implemented in a single power stage topology that comprises, power supply, e.g., a battery represented by voltage $V_{IN}$, diode D1, boost capacitor $C_{BOOST}$, switches Q1 through Q4, here, implemented as FETs, inductor L1, current sense resistor RCS, and an IR emitter. As depicted, the IR emitter may comprise an array of LEDs or Vertical-Cavity Surface-Emitting Lasers (VCSELs) that may be controlled by switch Q4 that controls the current flowing through the IR emitter.

LED driver circuit 300 may be used, for example, in applications that utilize 1 to 3 IR LEDs, each LED accounting for a forward voltage of about 2.5 V to 5 V, and some applications may utilize 1 or 2 IR VCSELs, such that the resulting IR emitter voltage may vary, e.g., between 1.5 V and 15 V. It is understood that these examples are not intended to limit the scope if the invention and its applications.

In operation, in embodiments, LED driver circuit 300 may switch between two modes of operation. For example, a first mode-a buck-boost mode-discussed in greater detail with reference to FIG. 4, may use a power supply to charge the capacitor $C_{BOOST}$ by using a sub-circuit (i.e., portions) of LED driver circuit 300. That sub-circuit may be formed mainly by current paths that involve power supply, capacitor $C_{BOOST}$, switches Q1 through Q3, diode D1, and inductor L1.

In embodiments, in such buck-boost mode, switches Q1, Q2, and Q3 of the sub-circuit may be controlled to regulate a current flowing from $V_{IN}$ to the capacitor $C_{BOOST}$ through inductor L1, e.g., by using a constant charging current. The inductor current charges the capacitor $C_{BOOST}$ while the IR emitter is off and causes the voltage $V_{BOOS\_T}$ to increase. In embodiments, controlling switch Q1 allows the capacitor $C_{BOOST}$ to be charged with a relatively flat, low peak input current without any significant dependence on the ratio of $V_{IN}$ to $V_{BOOS\_T}$ and irrespective of the capacity to which the capacitor $C_{BOOST}$ has been charged.

Advantageously, this allows the capacitor $C_{BOOST}$ to discharge fully to the IR emitter cutoff, such that the energy storage capability of the $C_{BOOST}$ capacitor may be fully utilized. Further, this allows capacitor $C_{BOOST}$ to have a relatively lower capacitance than would otherwise be possible, thus, reducing both capacitor size and the cost of producing LED driver circuit 300. In addition, in embodiments, capacitor voltage $V_{BOOS\_T}$ may be used by the control circuit to prevent overcharging of the capacitor $C_{BOOST}$.

In a second mode of operation—a buck mode—discussed in greater detail with reference to FIG. 5, the IR emitter may be driven by the capacitor $C_{BOOST}$ that acts as a current source. In embodiments, this mode may use a buck sub-circuit of buck-boost circuit 300 that may be formed mainly by capacitor $C_{BOOST}$, switches Q2 through Q4, inductor L1, and the IR emitter that represent the load. The buck sub-circuit may control switches Q2 and Q3 to regulate the current that flows from the capacitor $C_{BOOST}$ through inductor L1 to the load, i.e., the IR emitter. Switch Q1 (not shown in FIG. 5) is turned off to disconnect the power supply $V_{IN}$ from the power stage, and switch Q4 is turned on, connecting the load to the power stage.

Typically, when one sub-circuit of LED driver circuit 300 actively operates in one mode another sub-circuit remains inactive and vice versa, except for portions of LED driver circuit 300 that may be shared by both sub-circuits. As an example, in embodiments, the inductor and the sense resistor RCS may advantageously be used in both modes of operation. As a result, the sense resistor RCS may sense the current flowing through inductor L1 even though the direction of current flow may be different for the two different modes of operation. In addition, LED driver 300 may operate as a single converter circuit that performs the functions of both a boost converter circuit and those of a buck converter circuit.

Advantageously, the circuits and methods of controlling an H-bridge, non-inverting buck-boost circuit, or other topology to regulate the input current herein desensitize the circuit to input-to-output voltage ratios and allow mode transitions, e.g., from and to buck mode of operation, to occur independent of voltage $V_{BOOS\_T}$ of the capacitor $C_{BOOST}$.

It is understood that, like all circuits presented herein, LED driver 300 is not limited to the constructional detail shown in FIG. 3 or described in the accompanying text. For example, as a person of skill in the art will appreciate, two discrete power stages may be used to implement LED driver circuit 300. One of skill in the art will further appreciate that additional or different circuit components, such controllers, error amplifiers, and control signals not shown in FIG. 3, may be utilized to accomplish the objectives of the present disclosure. For example, diode D1 may be substituted with a FET switch to implement a full H-bridge, or switch Q3 may be substituted with a diode, and so on.

Figure 4:
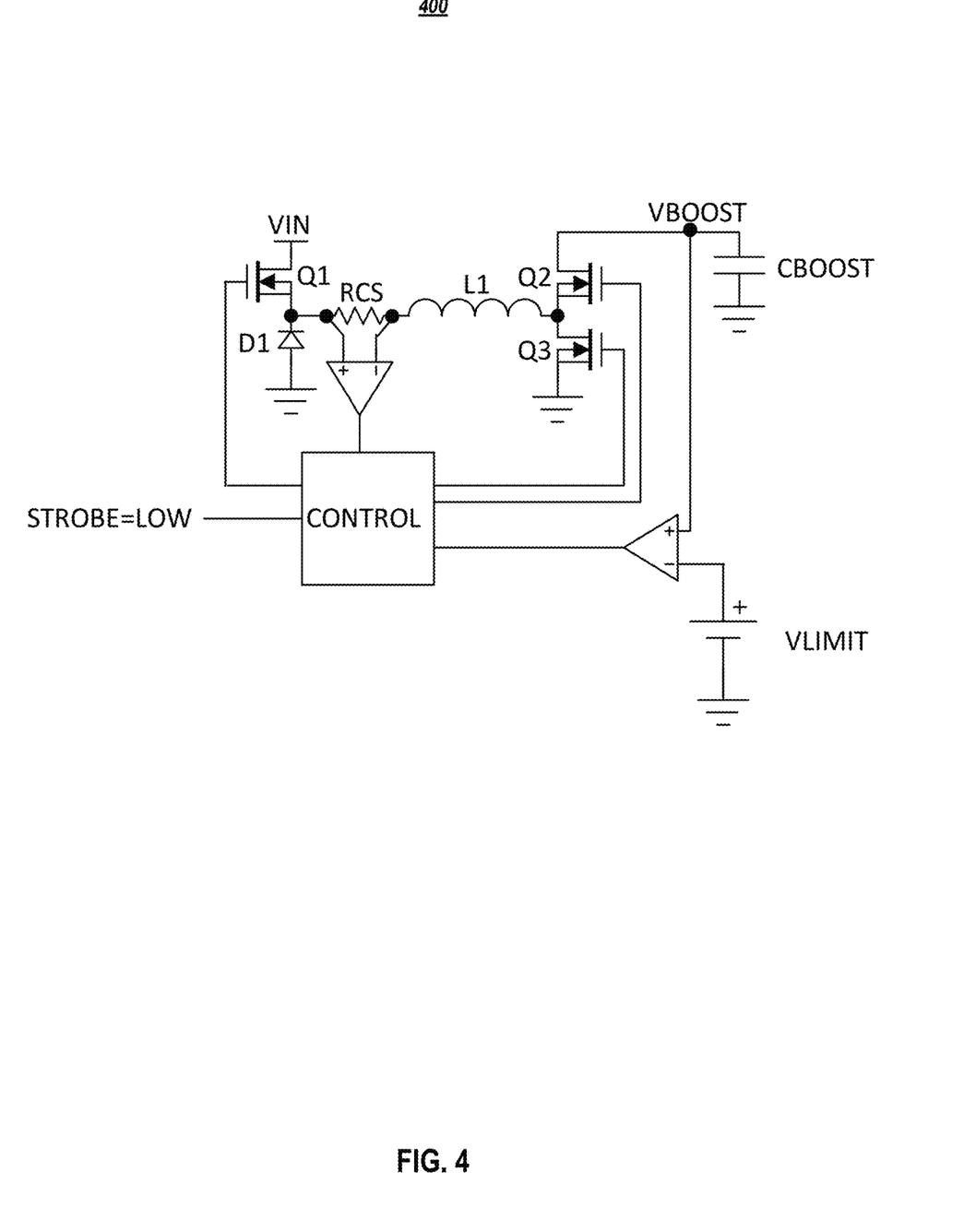
FIG. 4 illustrates an exemplary buck-boost sub-circuit according to various embodiments of the present disclosure.

FIG. 4 illustrates an exemplary buck-boost sub-circuit according to various embodiments of the present disclosure. In embodiments, boost sub-circuit 400 comprises, power supply $V_{IN}$, diode D1, boost capacitor $C_{BOOST}$, switches Q1 through Q3, inductor L1, current sense resistor RCS, a controller, a comparator, and a differential amplifier. It is understood that the controller may be implemented as an integrated circuit (IC) that couples to the boost sub-circuit. Further, the comparator may be implemented as a hysteresis comparator that defines respective upper and lower threshold values of a hysteresis window.

In embodiments, information obtained by the current sense resistor RCS may be used to control the switching behavior of switch Q1. In addition, switch Q1 may be coupled to a logic device, such as an AND gate that may be also coupled to receive a signal equivalent to a low frequency strobe signal.

In embodiments, boost sub-circuit 400 may serve as a DC-DC regulator that by operating in buck-boost mode regulates the current flowing from $V_{IN}$ to capacitor $C_{BOOST}$ through inductor L1, e.g., to be a relatively constant current that charges capacitor $C_{BOOST}$. As will be discussed with reference to FIG. 5, the controller may transition to act as a DC-DC regulator that operates in a buck mode to regulate the current flowing from the capacitor $C_{BOOST}$ through inductor L1 to a load such as an IR emitter. In embodiments, the transition between the two different modes may be controlled, i.e., activated and deactivated, by a logic signal, e.g., the status of the strobe signal such that once the strobe signal is low, circuit 400 operates in buck-boost mode and switch Q4 (shown in FIG. 5), which is controlled by the strobe signal, is turned on when strobe signal is high and vice versa. Once the status of the strobe signal is set to high, circuit 400 may transition to a buck mode of operation, turning on switch Q4. It is noted that transitions initiated by switch Q4 may generally occur at a frequency that is relatively lower than the relatively high switching frequency of switches Q2 and Q3 that may be controlled, for example, by a PWM signal.

In embodiments, in buck-boost mode operation, inductor L1 in the boost converter sub-circuit 400 transfers energy from input power supply $V_{IN}$ to the capacitor $C_{BOOST}$, and the IR emitter (not shown) remains inactive, i.e., turned off.

The controller may sense the voltage $V_{BOOS\_T}$ and regulate it as an output voltage, e.g., in a control loop that uses $V_{BOOS\_T}$ to determine a duty cycle for switches Q2 and Q3, which may control the voltage $V_{BOOS\_T}$ to a predetermined output voltage. It is understood that switches Q2 and Q3 may be switched at any suitable switching frequency.

In embodiments, once the controller receives a strobe signal that is low, an inductor current that may be sensed, e.g., by the differential amplifier across the RCS sense resistor, flows from $V_{IN}$ toward $C_{BOOST}$. In embodiments, the controller may use this information to generate a set of switching control signals (and/or their inverse) to drive switches Q1, Q2, and Q3 to regulate the current through inductor L1. In embodiments, once switches Q1 and Q3 are turned on, current flows through the inductor L1 and, thus, the amount of energy stored therein increases. Switch Q4 is turned off, thus, disconnecting the IR emitter load from the power stage. The current flowing from $V_{IN}$ to the capacitor $C_{BOOST}$ causes the voltage $V_{BOOS\_T}$ to increase.

By regulating the current through inductor L1 in this manner, high input current transients and peak currents, which in existing approaches may result from an uncontrolled current (inrush current) into the capacitor and may cause unwanted EMI and related issues, may be significantly reduced or eliminated altogether.

In addition, the voltage $V_{BOOS\_T}$ may be sensed by any means known in the art and used to generate a control signal that, in embodiments, may be used to prevent overcharging of the capacitor $C_{BOOST}$, e.g., by terminating a constant current charging once the voltage VBOOST reaches or exceeds a programmed target voltage (e.g., 14V-24V).

In embodiments, once a predetermined threshold, e.g., a threshold related to the programmed target voltage is reached, a hysteretic control may be employed to halt or limit the charging of the capacitor $C_{BOOST}$, e.g., until the voltage $V_{BOOS\_T}$ drops below a different threshold, reference voltage, or hysteresis point that may be defined by the comparator, at which time the controller may initiate charging to resume.

Figure 5:
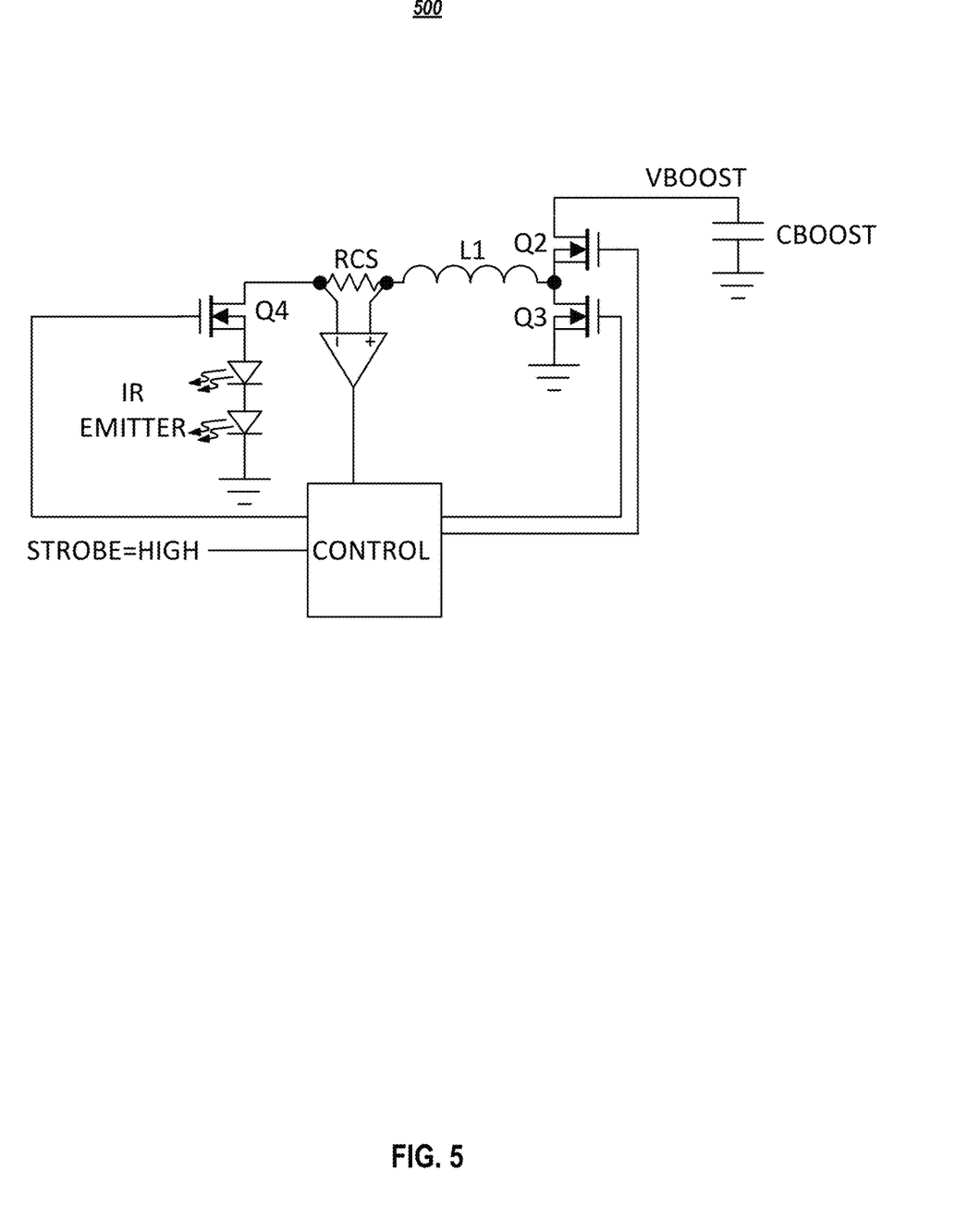
FIG. 5 illustrates an exemplary buck sub-circuit according to various embodiments of the present disclosure.

In embodiments, once the strobe signal is set to a high state, the buck-boost converter sub-circuit 400 may be deactivated, i.e., turned off, and the controller may activate the buck converter sub-circuit, e.g., according to the circuit shown FIG. 5 to drive a load. A person skilled in the art will appreciate that the teachings of the present disclosure may be applied to a wide variety of loads used in numerous applications that may benefit from a buck-boost arrangement. As those skilled in the art will further appreciate, a suitable system utilizing a driver may comprise more or less circuit components and control an output voltage instead an output current.

FIG. 5 illustrates an exemplary buck sub-circuit according to various embodiments of the present disclosure. In embodiments, buck sub-circuit 500 may comprise, boost capacitor $C_{BOOST}$, switches Q2 through Q4, inductor L1, current sense resistor RCS, IR emitter, controller, and differential amplifier. The IR emitter may be implemented as an array of light emitting diodes that, in embodiments, may be considered located at the output of buck sub-circuit 500, whereas the capacitor $C_{BOOST}$ may be considered a power supply that is located at the input of buck sub-circuit 500.

In a buck mode of operation, e.g., once the boost circuit shown in FIG. 4 is turned off, the controller in buck converter sub-circuit 500 in FIG. 5 may cause switch Q4 to turn on (and switches Q1 and Q3 to turn off), such that energy that may have been stored in the capacitor $C_{BOOST}$ (e.g., due to the operation in a buck-boost mode described previously) may flow through switch Q2 to the inductor L1 and the IR emitter.

In embodiments, the current flowing through inductor L1 in buck sub-circuit 500 may be used to directly or indirectly control signals that operate switches Q2 and Q3, e.g., to regulate the inductor current that flows from capacitor $C_{BOOST}$ and drives the IR emitter. In detail, in buck mode, the input power supply is disconnected from the power stage by virtue of switch Q1 being turned off, such that the IR emitter cannot draw any current from the input power supply. Instead, the IR emitter may receive energy from boost capacitor $C_{BOOST}$, whose voltage starts to decline due to the fact that the input power (i.e., $V_{IN}$) is cut off. In embodiments, the controller may regulate the load current such that the IR emitter is turned on, e.g., 1% of the time.

In embodiments, once the controller receives a strobe signal that is high, current flowing from $C_{BOOST}$ through inductor L1 to the IR emitter may be sensed, e.g., in a control loop by a differential amplifier across the same RCS sense resistor as in FIG. 4. In embodiments, the current sense resistor may be used to determine a duty cycle for switches Q2 and Q3 operating in buck mode. As a result, the current through the IR emitter may be controlled to a predetermined level.

In embodiments, similar to the operation of the circuit shown in FIG. 4, the controller in FIG. 5 may use the information from current sense resistor RCS to generate a set of switching control signals and/or their inverse to drive switches Q2 and Q3 to regulate the current through inductor L1 that flows from $C_{BOOST}$ to the IR emitter through switch Q4 that is turned on. In embodiments, the control signal controlling switch Q4 may be the logical equivalent of the strobe signal, and the control signal for switch Q1 may be thought of as a switching control signal that combines with the inverse of the strobe signal in a logical-AND such that the control signal that controls switch Q1 is applied once the status of the strobe signal is low. Otherwise, once the strobe signal is high, switch Q1 is turned off.

Figure 6:
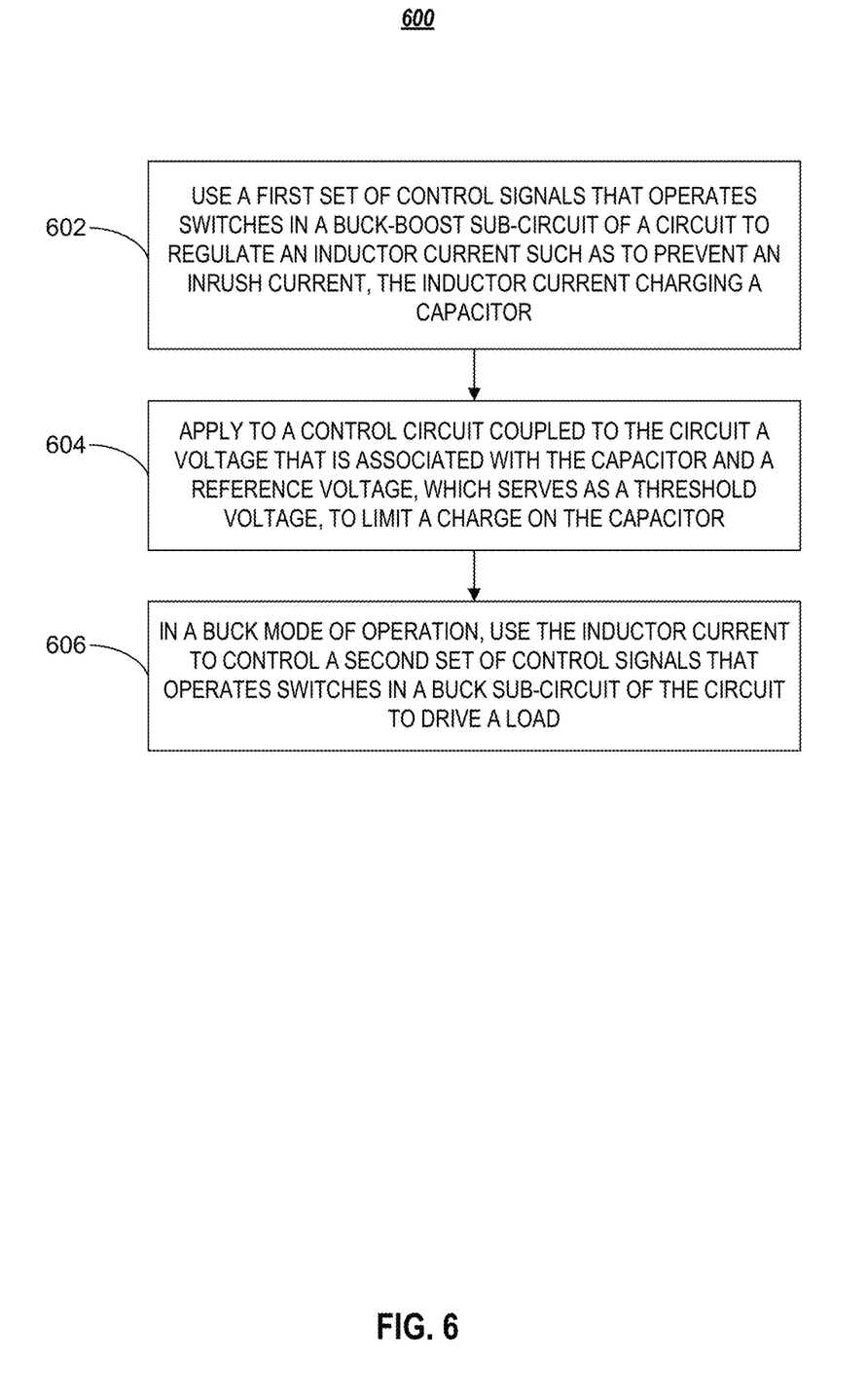
FIG. 6 depicts a flowchart of an illustrative process for operating an LED driver according to various embodiments of the present disclosure.

FIG. 6 depicts a flowchart of an illustrative process for operating an LED driver according to various embodiments of the present disclosure. In one or more embodiments, process 600 may begin at step 602 when a first set of control signals that operates switches in a buck-boost sub-circuit of a circuit is controlled such as to regulate an inductor current. The inductor current, which charges a capacitor, may be regulated to prevent an inrush current.

At step 604, a voltage associated with the capacitor and a reference voltage that may serve as a threshold voltage may be applied to a control circuit coupled to the circuit to prevent the capacitor from overcharging.

At step 606, e.g., in a buck mode of operation, the inductor current may be used to control a second set of control signals that operates switches in a buck sub-circuit of the circuit to drive a load, such as an array of light emitting diodes.

It shall be noted that: (1) certain steps may optionally be performed; (2) steps may not be limited to the specific order set forth herein; (3) certain steps may be performed in different orders; and (4) certain steps may be done concurrently.

Figure 7:
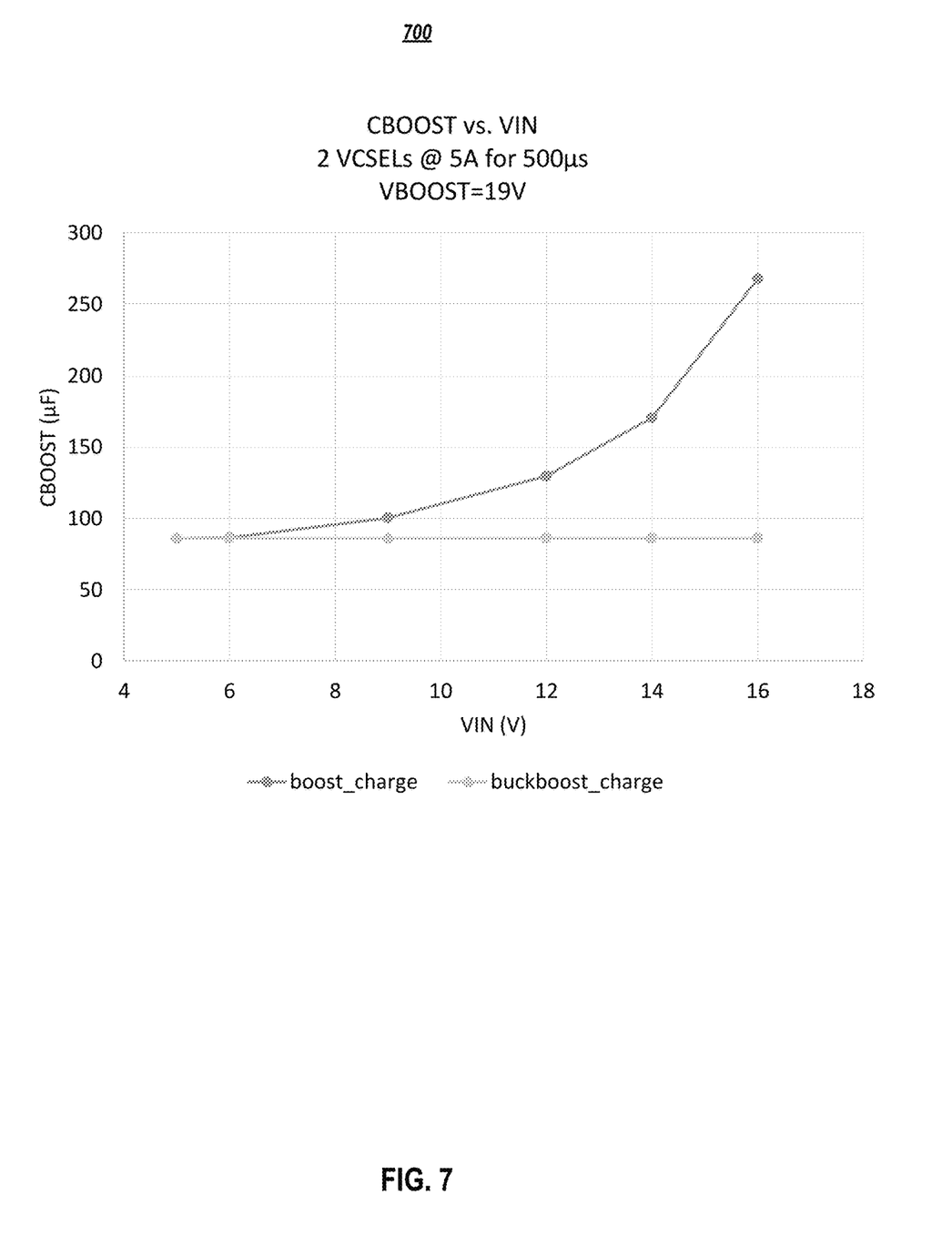
FIG. 7 depicts experimental data that illustrate exemplary lower capacitance values that capacitors may assume when being implemented in circuits according to various embodiments of the present disclosure.

FIG. 7 depicts experimental data that illustrate exemplary lower capacitance values that capacitors may assume when being implemented in circuits according to various embodiments of the present disclosure. Controlling switch Q1 in FIG. 3 as previously discussed, advantageously, allows the capacitor $C_{BOOST}$ to be charged (and discharged, e.g., to the IR emitter cutoff) without regard to the ratio of $V_{IN}$ to $V_{BOOST}$ according to various embodiments presented herein. As the example in FIG. 7 shows, the capacitance and, thus, the size of $C_{BOOST}$ may remain constant for designs of various input voltage levels since the state of the charge of the capacitor is deemed irrelevant. The results in FIG. 7 thus indicate that the capacitance of a capacitor may be reduced, for example, from 200-300 μF to less than 100 μF even if the input voltage more than triples from 5 V to 16 V.

It is noted that any experiments and results provided herein are provided by way of illustration and were performed under specific conditions using a specific embodiment or embodiments; accordingly, neither these experiments nor their results shall be used to limit the scope of the disclosure of the current patent document.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using application specific integrated circuits (ASICs), programmable arrays, digital signal processing circuitry, or the like. Accordingly, the terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks; optical media such as CD-ROMs and holographic devices; magneto-optical media; and hardware devices that are specially configured to store or to store and execute program code, such as ASICs, programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A DC/DC regulator comprising:
a capacitor;
an inductor that couples a first switch to a second switch that couples the inductor to the capacitor and controls a load current;
an input switch that couples an input voltage to the first switch, the input voltage drives an inductor current through the inductor; and
a controller that performs steps comprising:
in a first mode of operation, controlling the input switch to regulate the inductor current to charge the capacitor with a substantially constant charging current to reduce transient effects; and
in a second mode of operation, using the capacitor as a power source to drive a load.

2. The DC/DC regulator according to claim 1, further comprising a control circuit coupled to the capacitor, the control circuit uses a voltage at the capacitor and a threshold voltage to limit a charge on the capacitor.

3. The DC/DC regulator according to claim 1, further comprising a current sense resistor that senses the inductor current in the first and second modes of operation.

4. The DC/DC regulator according to claim 1, wherein the first mode of operation is a buck-boost mode that comprises the inductor, the input switch, a buck diode, and the capacitor.

5. The DC/DC regulator according to claim 1, wherein the first mode of operation is a buck mode that comprises the inductor, the first switch, and the capacitor.

6. The DC/DC regulator according to claim 1, wherein the load comprises at least one of an LED or a Vertical-Cavity Surface-Emitting Laser (VCSEL).

7. The DC/DC regulator according to claim 1, comprising at least one of an H-bridge or a non-inverting buck-boost converter.

8. The DC/DC regulator according to claim 1, wherein the DC/DC regulator is a light emitting diode (LED) driver that comprises a single-stage.

9. The DC/DC regulator according to claim 1, wherein the capacitor has a capacitance of equal to or less than 100 µF.

10. A method for operating a DC-DC regulator, the method comprising:
controlling a first set of switches to operate a DC-DC regulator in a buck-boost mode and control an inductor current to remain substantially constant when charging a capacitor, thereby, preventing effects resulting from transient currents; and
using the inductor current to control a second set of switches to operate the DC-DC regulator in a buck mode to drive a load by using the capacitor as a power source.

11. The method according to claim 10, wherein a transition between the buck-boost mode and the buck mode is substantially unaffected by an input-to-output voltage ratio of the DC-DC regulator or a charging status of the capacitor, thereby, allowing the capacitor's full capacity to be utilized.

12. The method according to claim 10, further comprising controlling a duty cycle of at least one switch among the first set of switches to control the inductor current.

13. The method according to claim 10, further comprising controlling a duty cycle of at least one switch among the second set of switches to control the load current.

14. The method according to claim 10, further comprising using a voltage at the capacitor to control a duty cycle of at least one switch among the second set of switches to control the voltage as an output voltage.

15. The method according to claim 14, further comprising monitoring the voltage at the capacitor to generate a control signal, in response to the voltage reaching a threshold, halts the charging current to prevent the capacitor from overcharging.

16. A light source driver having a single-stage dual-function DC/DC regulator, the light source driver comprising:
a capacitor;
an inductor that couples a first switch to a second switch that couples the inductor to the capacitor and controls load current;
an input switch that couples an input voltage to the first switch, the input voltage drives an inductor current through the inductor;
a load; and
a controller that performs steps comprising:
in a first mode of operation, controlling the input switch to regulate the inductor current to charge the capacitor in a manner such as to reduce an inrush current to the capacitor; and
in a second mode of operation, using the capacitor as a power source to drive the load.

17. The light source driver according to claim 16, further comprising a control circuit coupled to the capacitor, the control circuit uses a voltage at the capacitor and a threshold voltage to limit a charge on the capacitor.

18. The light source driver according to claim 16, further comprising a current sense resistor that senses the inductor current in the first and second modes of operation.

19. The light source driver according to claim 16, wherein the first mode of operation is a buck-boost mode that comprises the inductor, the input switch, a buck diode, and the capacitor, and wherein the first mode of operation is a buck mode that comprises the inductor, the first switch, and the capacitor.

20. The light source driver according to claim 16, wherein the load comprises at least one of an LED or a Vertical-Cavity Surface-Emitting Laser (VCSEL).

* * * * *